United States Patent Office 3,132,315
Patented May 5, 1964

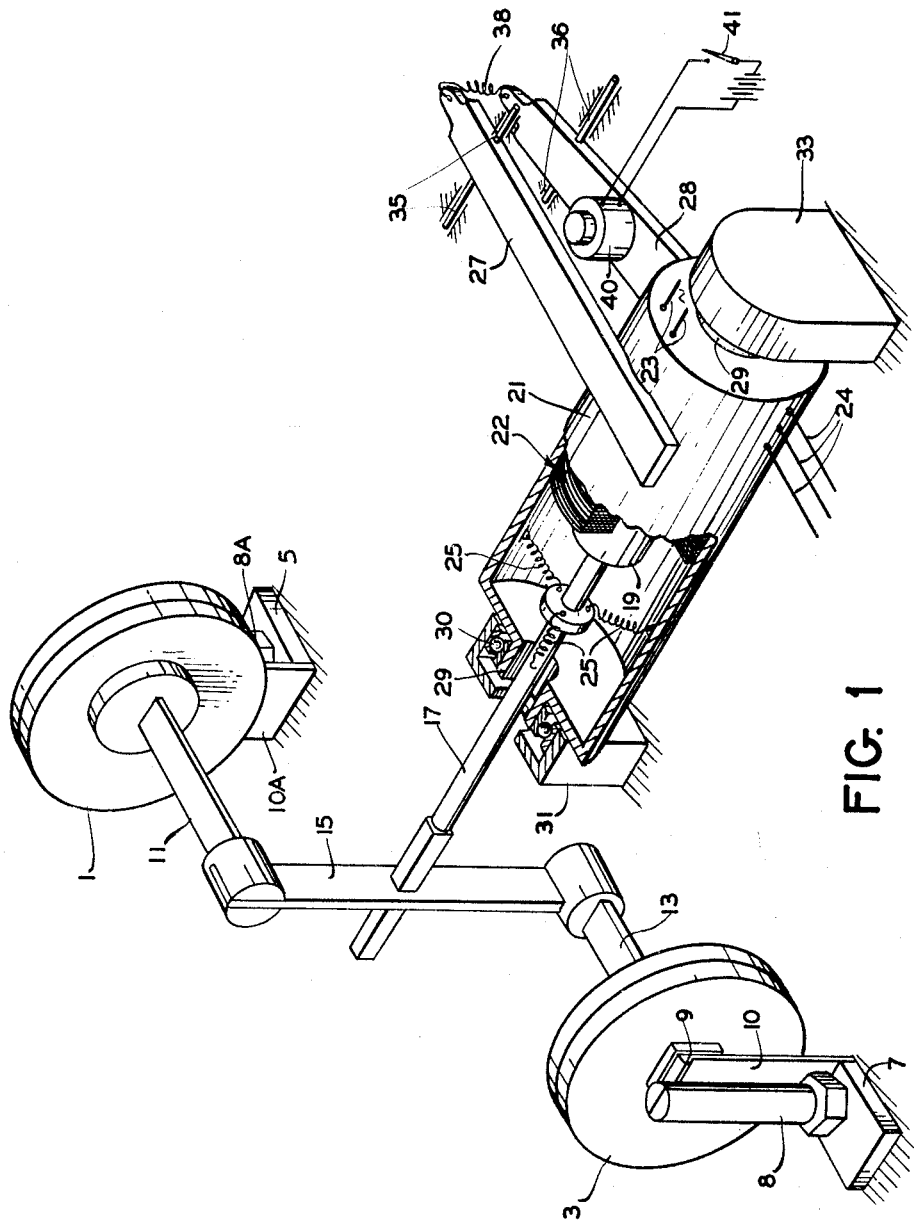

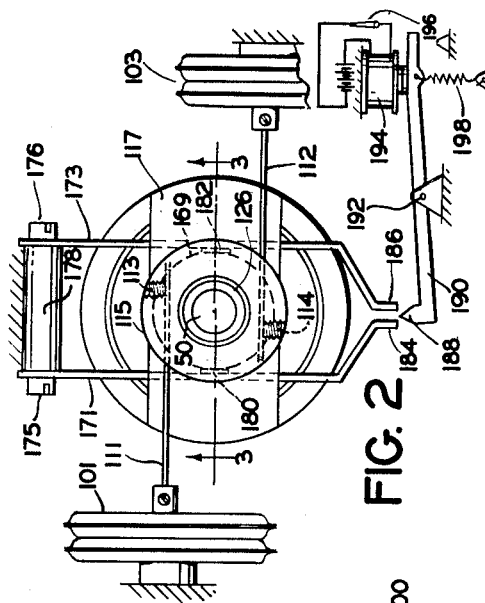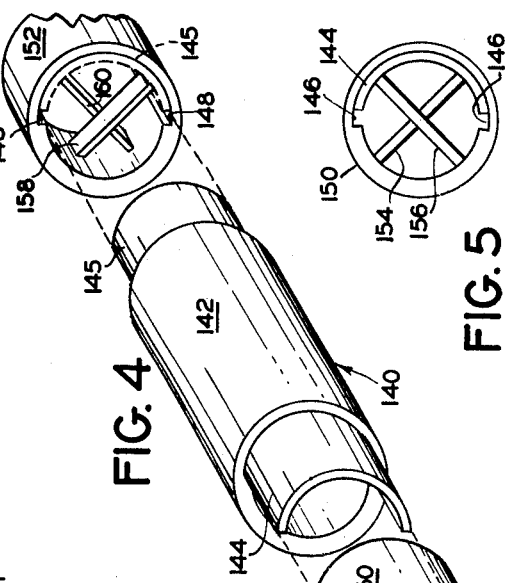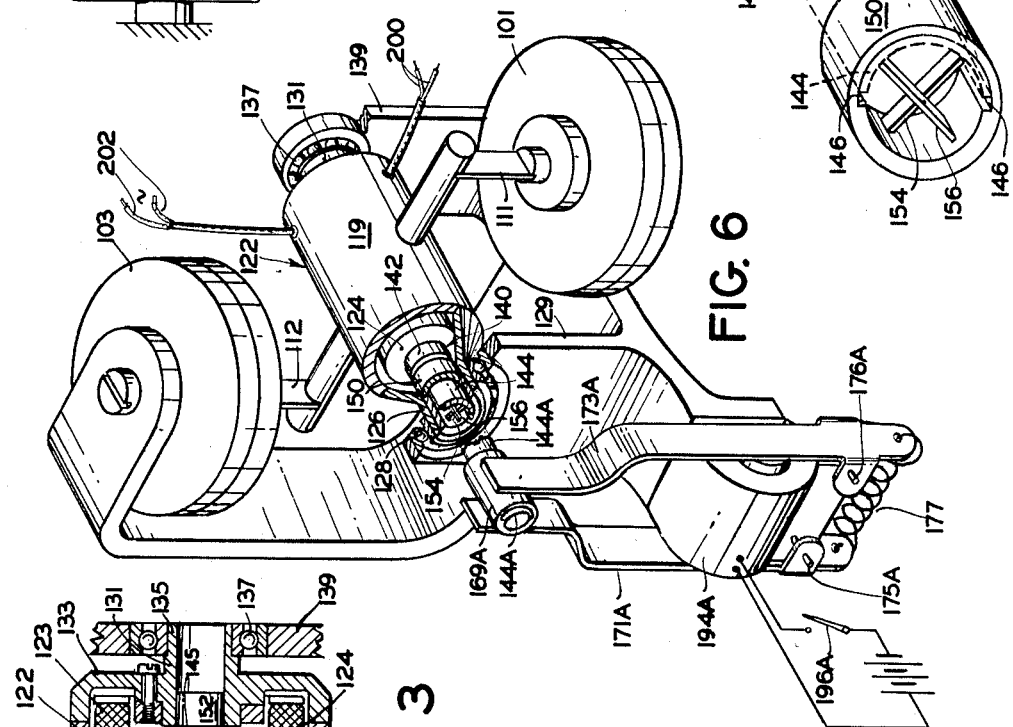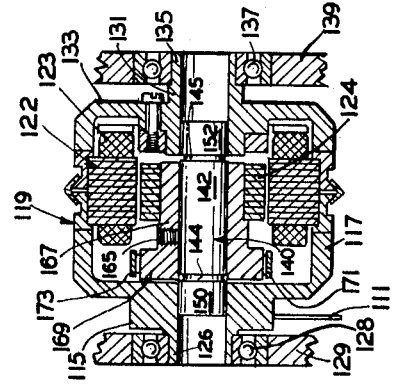

3,132,315
FLUID PRESSURE SENSITIVE ELECTRICAL SIGNAL GENERATING DEVICE WITH FLEXURAL PIVOT
Francis Henry Sand Rossire, Salisbury, Conn., assignor to The Bendix Corporation, Teterboro, N.J., a corporation of Delaware
Filed Oct. 7, 1960, Ser. No. 61,277
10 Claims. (Cl. 336—30)

The invention relates to an improved fluid pressure sensitive device for generating an electrical signal in response to changes in altitude or airspeed of an aircraft and more particularly to an instrument adapted for use in controlling an automatic pilot under the extreme vibratory conditions encountered in aircraft or in an aircraft altitude control system of a type such as disclosed and claimed in U.S. Patent No. 2,512,902 granted June 27, 1950, to F. Henry S. Rossire and assigned to Bendix Aviation Corporation, now by change of name The Bendix Corporation.

An object of the invention is to provide a novel altitude control or airspeed control instrument so designed as to withstand the extreme vibratory conditions encountered in guided missiles, and an instrument of such simplicity in construction that the same may be readily made of extremely small size and of light weight.

Another object of the invention is to provide an aircraft control instrument of the aforenoted type in which the basic motivating force is derived from a pair of bellows or diaphragms arranged in diametrically opposite relation so as to effectively eliminate position error sensitivity while providing novel means whereby motion of the bellows may be imparted to a signal generator shaft through a rocking link secured at opposite ends to the bellows through flexible connecting members and in which the signal generator shaft has a novel spring suspension or flexural pivot for supporting the shaft within the generator housing so that expansion and contraction of the bellows causes the signal generator shaft to rotate and in turn effect a corresponding rotation of the generator housing through the spring suspension so long as the generator housing is freely rotatable in suitable housing bearings, and in which arrangement there is included a solenoid operated brake which upon energization of the solenoid applies a braking force to the generator housing so that relative motion may thereupon be effected between the generator shaft and the housing to produce an output signal upon movement of the bellows assembly from a position corresponding to the altitude or airspeed at which the brake is rendered effective by the energization of the solenoid.

Another object of the invention is to provide a novel control instrument of the aforenoted type in which the basic motivating force is derived from a pair of bellows arranged in diametrically opposite relation to drive a signal generator housing operatively connected through a novel flexural pivot to a signal generator rotor shaft so as to cause the rotor shaft to follow the movement imparted to the generator housing by the bellows to effect a null signal condition, together with a solenoid operated brake which upon energization of the solenoid applies a braking force to the signal generator rotor shaft so that relative movement may thereupon be effected between the signal generator housing and the rotor to provide an output signal upon movement of the bellows assembly from a position corresponding to the altitude or airspeed at which the brake is rendered effective by the energization of the solenoid.

Another object of the invention is to provide a novel assemblage in which the signal generator rotor, the rotor shaft brake and flexural pivot are compactly mounted within the signal generator housing.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings:

FIGURE 1 is a diagrammatic perspective view of one form of the invention.

FIGURE 2 is an end view of a second form of the invention.

FIGURE 3 is a sectional view of FIGURE 2 taken along the lines 3—3 and looking in the direction of the arrows.

FIGURE 4 is an enlarged exploded view of the novel flexural pivot assembly embodied in the second form of the invention of FIGURES 2 and 3.

FIGURE 5 is an end view of the novel flexural pivot assembly of FIGURE 4.

FIGURE 6 is a perspective view of a third form of the invention.

Referring to the drawing of FIGURE 1, the basic motivating force, as shown, is derived from a pair of diaphragm bellows 1 and 3 supported at 5 and 7 in diametrically opposite relation so as to effectively eliminate position error "G" sensitivity and thereby enable the pressure sensitive unit to withstand high vibration forces. The diaphragm bellows 3 is temperature compensated by a bi-metal element 8 affixed at one end to the support 7 and bearing at the opposite end on an upper end portion 9 of a leaf spring 10 connecting the bellows 3 to the support 7 so as to adjustably position the bellows 3 relative to the support 7 with changes in the ambient temperature. A similar bi-metal element 8A is affixed at one end to the support 5 and bears at the opposite end on an upper end portion of a leaf spring 10A connecting the bellows 1 in as imilar manner to the support 5 so as to also adjustably position the bellows 1 relative to the support 5 with changes in the ambient temperature. Thus the bi-metal elements 8 and 8A effectively compensate the bellows assembly for such changes in the temperature.

The diaphragm bellows 1 and 3 are operatively connected through flexible connecting members 11 and 13 to opposite ends of a rocking link 15 which is in turn secured to a signal generator shaft 17 operatively connected to a rotor member 19 mounted in a housing 21 of a signal generator or synchro 22 having input excitation lines 23 and output signal lines 24.

The bellows 1 and 3 may be evacuated and arranged, as shown in FIGURE 1, so as to respond to changes in ambient atmospheric pressure applied to the exterior surfaces thereof as upon changes in the prevailing altitude. As an alternative arrangement, the interior and exterior surfaces of the bellows may have applied thereto dynamic and static pressures respectively from a pitot tube of conventional type so as to respond to changes in the airspeed of an aircraft.

The foregoing arrangement of the bellows 1 and 3, as shown by FIGURE 1, is such as to permit the signal generator shaft 17 to rotate as the diaphragm bellows 1 and 3 expand or retract with changes in the effective operating fluid pressures acting thereon. Further, as shown in the drawing, the signal generator shaft 17 is spring suspended within the signal generator housing 21 by suitable spring elements 25 so as to eliminate the necessity of supporting bearings for the rotor element 19 and permit the rotor element 19 to rotate relative to the signal generator housing 21 upon the housing 21 being held from rotor movement by the application of a braking force thereto through the operation of brake elements 27 and 28, as explained hereinafter. The signal generator housing 21 has axial portions 29 rotatably mounted within suitable roller bearings 30 provided at opposite ends of the housing 21 in mounting members 31 and 33 carried by the supporting structure of the unit.

Thus, upon the brake force applied by the members 27 and 28 being released, the spring suspension 25 for the signal generator shaft 17 will permit the housing 21 of the signal generator 23 to rotate with the rotor 19 upon the diaphragm bellows 1 and 3 expanding or contracting, whereupon the signal generator or synchro 22 will be ineffective to produce an electrical output signal in response to the movement imparted by the diaphragm bellows 1 and 3.

As shown in the drawings, the brake members 27 and 28 are pivoted respectively on pins 35 and 36 carried by the supporting structure of the unit while a spring 38 is operatively connected between ends of the brake members 27 and 28 to effectively hold the opposite ends of the brake members 27 and 28 disengaged from the signal generator housing 21 so that under the aforenoted disengaged brake operating condition there will be no relative motion between the shaft 17 operating rotor 19 and the housing 21, since the spring 38 will hold the brake members 27 and 28 disengaged from the signal generator housing 21 permitting the spring suspension to cause the housing 21 to follow any movement of the shaft 17 and rotor 19.

There is further provided a solenoid 40 mounted on the brake member 28 in operative relation to the brake member 27 and energized upon closure of an operator-operative switch 41. The solenoid 40 is effective upon energization to overpower the spring 38 and to cause the brake members 27 and 28 to be pivoted about the pins 35 and 36 so as to grasp therebetween the generator housing 21 to apply a braking force thereto to hold the housing 21 in an operator selected position and a position corresponding to the fluid operating pressure effective on the diaphragm bellows 1 and 3 at the time of energization of the solenoid 40. The operator selected position will then be representative of the prevailing altitude or airspeed resulting in such operating pressure at the time of energization of the solenoid 40. Thereafter, so long as the housing 21 is held securely by the brake members 27 and 28 any change in the prevailing altitude or airspeed effecting such operating pressure will cause the diaphragm bellows 1 and 3 to change their effective length, thus rotating the signal generator shaft 17 and rotor 19 relative to the housing 21 while deflecting the suspension springs 25 so that the resulting relative motion between the signal generator shaft 17 and housing 21 will cause a signal output to be produced by the signal generator or synchro 22. This signal applied across output lines 24 may then be applied to an aircraft control to maintain the altitude or airspeed of the aircraft at the value represented by the operator selected position of housing 21 or the output signal may be amplified through a suitable electronic amplifier for use in a conventional manner in the control of an aircraft or missile, as the case may be, as shown, for example, in the aforementioned U.S. Patent No. 2,512,902.

In the second form of the invention illustrated by FIGURES 2, 3, 4 and 5, fluid pressure responsive diaphragm bellows 101 and 103 may, as in the case of the bellows 1 and 3, be arranged so as to respond to changes in the prevailing altitude pressure or airspeed of an aircraft. The bellows 101 and 103 are operatively connected in opposing relation by flexible wires 111 and 112 connected, respectively, by fastening screws 113 and 114 to an annular flange 115 projecting axially from a portion 117 of a housing 119 of a signal generator or synchro 122. The synchro 122 has inductive windings 123 of conventional type affixed in the housing 119 and a rotor member 124 in operative relation therewith. The synchro 122 may be of a conventional type having input excitation lines leading thereto and output signal lines leading therefrom and not shown.

The flange 115 has an axial portion 126 rotatably mounted in suitable roller bearings 128 provided at one end of the housing 119 in a mounting member 129 carried by the supporting structure of the unit. At the opposite end of the housing 119 there is provided a second flange 131 projecting axially from a portion 133 of the housing 119. The flange 131 has an axial portion 135 which is in turn rotatably mounted in suitable roller bearings 137 provided in a mounting member 139 carried by the supporting structure of the unit.

The foregoing arrangements permit the signal generator housing 119 to rotate in the bearings 128 and 137 as the bellows 101 and 103 expand or contract with changes in the effective operating fluid pressures acting thereof. Further, as shown in FIGURE 3, the rotor member 124 is mounted in the housing 119 by a novel flexural pivot assembly 140, shown in detail in FIGURE 4 and which may be of a type described and claimed in U.S. Patent No. 3,073,584, granted January 15, 1963, to Henry Troeger, and assigned to The Bendix Corporation.

As shown in detail in FIGURE 4, the flexural pivot assembly 140 includes a tubular member 142 having segmental sleeve portions 144 and 145 formed integral with the tubular member 142 and extending axially from opposite ends thereof.

The segmental sleeve portions 144 and 145 are slidably mounted in arcuate channels 146 and 148 formed in collars 150 and 152 mounted on the segmental sleeve portions 144 and 145. As shown in FIGURES 4 and 5, the arcuate channels 146 and 148 permit limited movement of the segmental sleeve portions 144 and 145 therein relative to the collars 150 and 152 respectively. Such limited movement of the segmental sleeve portions 144 and 145 in the channels 146 and 148, respectively, from the neutral position, shown in FIGURES 4 and 5, is resiliently opposed by cross spring members 154—156 and 158—160.

As shown in FIGURES 4 and 5, an end of each of the cross spring members 154 and 156 is affixed to an inner surface of the collar 150, while the other end of each of the cross spring members 154 and 156 is affixed to an inner surface of the segmental sleeve portion 144. The cross spring members 154—156 extend crosswise in a 90° angular relation one to the other in the neutral position.

Similarly, the cross spring members 158 and 160 each have an end affixed to an inner surface of the collar 152, while the other end of each of the cross spring members 158 and 160 is affixed to an inner surface of the segmental sleeve portion 145. The cross spring members 158 and 160 also extend crosswise in a ninety degree angular relation one to the other in the neutral position.

As shown in FIGURE 3, the tubular member 142 of the flexural pivot assembly 140 is secured by a fastening screw 165 within a tubular member 167 extending axially from the rotor 124 or the synchro 122, while the collar 150 is fastened in the flange 115 of the housing 119 and the collar 152 is fastened in the flange 131 of the housing 119.

Further, as shown in FIGURES 2 and 3, there is mounted at one end of the tubular member 167 and within the portion 117 of the housing 119 an annular flange 169 with which there is arranged in cooperative relative spring arms 171 and 173 each of which have an end thereof fastened at 175 and 176, respectively, to opposite ends of a mounting member 178. The spring arms 171 and 173 have brake shoes 180 and 182, respectively, fastened thereto and bearing under the spring tension of the arms 171 and 173 upon the annular flange 169 so as to apply a brake force to the rotor 124 of the synchro 122 to releasably hold the rotor 124 from moving with the housing 119 and windings 123 affixed in the housing 119.

The spring arms 171 and 173 have free end portions 184 and 186, respectively, arranged for operative engagement by a wedge portion 188 carried by an arm 190 pivoted at 192. The arm 190 is operative by an electromagnet 194 to bias the wedge portion 188 in a counterclockwise direction out of operative relation with the end portions 184 and 186 of the spring arms 171 and 173 upon energization of the electromagnet 194 by the closure of an operator-operative control switch 196.

However, upon the control switch 196 being opened so as to deenergize the electromagnet 194, a spring 198 acts to bias the arm 190 and wedge portion 188 in a clockwise direction into operative relation with the end portions 184 and 186 so as to force the spring arms 171 and 173 apart and the brake shoes 180 and 182 out of braking relation with the annular flange 169 and thereby release the rotor 124 of the synchro 122 for rotary movement with the housing 119.

In the aforenoted arrangement, it will be seen that upon the brake shoes 180 and 182 being moved out of braking relation with the annular flange 169 rotary movement may be imparted to the housing 119 through the connecting wires 111 and 112 by the contraction and expansion of the bellows 101 and 103 causing in turn movement to be imparted to the rotor member 124, through the flexural pivot 140. The flexural pivot 140 is connected to the housing 119 through the sleeves 150 and 152 and through the cross springs 154—156 and 158—160 to the tubular member 142 connected to the tubular member 167 of the rotor 124 by the fastening screw 165 so as to maintain the rotor 124 normally in a null signal position relative to the synchro winding 123 during such rotation of the housing 119.

However, upon the brake shoes 180 and 182 being released so as to bear upon the annular flange 169 under the tension of the spring arms 171 and 173, as upon energization of the electromagnet 194 and removal of the wedge member 188 from operative engagement with the end portions 184 and 186 of the spring arms 171 and 173, the braking force applied to the annular flange 169 releasably holds the rotor 124 from moving with the housing 119 and windings 123 as the housing 119 is rotatably positioned in the bearings 128 and 139 by changes in the pressure forces acting on the bellows 101 and 103.

Further, upon the rotor 124 being held by the brake force of the spring arms 171 and 173, the flexural pivot 140 through the cross springs 154—156 and 158—160 permits movement of the housing 119 relative to the rotor 124 within the range of permissible movement of the segmental sleeve portion 144 in the channel 145 and the segmental sleeve portion 145 in the channel 148 of FIGURE 4.

The aforenoted movement of the housing 119 relative to the rotor 124 causes in turn an electrical output signal to be applied by the synchro windings 123 indicative of a sensed condition, such as altitude or airspeed of an aircraft, above or below that prevailing at the time the brake force is first applied to the annular flange 169 of the rotor 124.

The output signal may be applied across suitable output lines from the synchro 122 to an aircraft control, as heretofore explained with reference to FIGURE 1, or the output signal may in turn be amplified through a suitable electronic amplifier for use in a conventional manner in the control of an aircraft or missile, as the case may be, as shown, for example, in the aforementioned U.S. Patent No. 2,512,902.

A third form of the invention is illustrated in FIGURE 6, in which corresponding numerals indicate corresponding parts to those described with reference to FIGURES 2 and 3. The form of invention of FIGURE 6 differs from the form of the invention of FIGURES 2 and 3 in that the segmental sleeve portion 144 extends at 144A from the flexural pivot assembly 140 and is embedded at its free end in an annular brake member 169A on which bear end portions of spring brake arms 171A and 173A. The spring brake arms 171A and 173A are pivotally mounted on pins 175A and 176A. A coil spring 177 is operatively connected between the opposite end portions of the arms 171A and 173A so as to normally bias the spring brake arms 171A and 173A out of braking relation with the brake member 169A so that the flexural pivot assembly 140 normally maintains the rotor 124 in a null signal position relative to synchro windings affixed within the housing 119 so that rotor 124 follows the adjusted position thereof during rotation of the housing 119, as heretofore explained with reference to the form of the invention of FIGURE 2.

There is further provided an electromagnet 194A mounted between the spring brake arms 171A and 173A and cooperating therewith so that upon energization of the electromagnet 194A by the closure of an operator-operative switch 196A, the spring brake arms 171A and 173A are biased by the electromagnet about the pins 175A and 176A, respectively, into contacting braking relation with the annular brake member 169A. The brake arms 171A and 173A thereupon effectively hold the segmental sleeve portion 144 of the flexural pivot assembly 140 and the rotor 124 from moving in response to a movement imparted to the housing 119 by the expansion and contraction of the bellows 101 and 103. Thus, the bellows 101 and 103 in response to a change in the effective fluid pressures acting thereon cause movement to be imparted to housing 119 and in turn an electrical output signal to be applied across output lines 200 by the change in the position of the synchro windings affixed within the housing 119 relative to the brake held rotor 124. The output signal is thereupon indicative of a sensed condition, such as altitude or airspeed of an aircraft, above or below that prevailing at the time the brake force is first applied at the brake member 169A and thereby to the rotor 124.

The synchro 122 may have excitation input lines 202 connected to a suitable source of alternating current and the electrical signals applied across the output lines 200 may be applied, as heretofore explained, to an aircraft control or amplified through a suitable electronic amplifier for use in a conventional manner in the control of an aircraft or missile as the case may be, as shown, for example, in the aforementioned U.S. Patent No. 2,512,902.

Although only three embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A signal generator comprising a housing element and a rotor element arranged in cooperative relation to said housing element for developing an output signal, flexural pivot means for normally centering said rotor element within said housing element in a non-signal developing position relative thereto, means for rotatably supporting said housing element, means responsive to fluid pressure changes operatively connected to one of said elements for imparting movement thereto, brake means selectively operative for retarding movement of the other of said elements to render said flexural pivot means ineffective to center said rotor element in the non-signal developing position relative to said housing element upon the fluid pressure responsive means effecting a movement to said one element relative to said other element to cause an output signal to be developed by said generator.

2. A signal generator comprising a housing and a rotor arranged in cooperative relation with said housing for developing an output signal, flexural pivot means for supporting said rotor within said housing and normally centering said rotor in a non-signal developing position relative thereto, bearing means for rotatably supporting said housing, means responsive to fluid pressure changes operatively connected to said rotor for imparting movement thereto, brake means selectively operative for retarding movement of the housing in said bearing means, said brake means being thereby operative to render said flexural pivot means ineffective to center said rotor in the non-signal developing position relative to said housing upon the fluid pressure responsive means effecting a movement of said rotor relative to said housing to cause an output signal to be developed by said generator.

3. The combination defined by claim 2 including a shaft operatively connecting said fluid pressure responsive means to the rotor, and said flexural pivot means including a plurality of spring members connected between an inner surface of said housing and said shaft so as to resiliently support the rotor within said housing in such a manner as to normally center said rotor in a non-signal developing position relative to the housing.

4. A signal generator comprising a housing and a rotor arranged in cooperative relation to said housing for developing an output signal, a flexural pivot means for supporting said rotor within said housing and normally centering said rotor within said housing in a non-signal devolping position relative thereto, bearing means for rotatably supporting said housing, means responsive to fluid pressure changes operatively connected to said housing for imparting rotary movement thereto, brake means selectively operative for retarding movement of said rotor, said brake means being thereby operative to render said flexural pivot means ineffective to center said rotor in the non-signal developing position relative to said housing upon the fluid pressure responsive means effecting a movement of said housing relative to said rotor to cause an output signal to be developed by said generator.

5. The combination defined by claim 4 including linkage means operatively connecting the fluid pressure responsive means to the housing, the flexural pivot means including a tubular member extending through the rotor and affixed thereto, collars secured in said housing, said collars having arcuate channels for supporting opposite end portions of the tubular member, said arcuate channels being so arranged as to permit limited angular movement of said end portions in the collars, cross spring members having opposite ends thereof affixed to an inner surface of said collars and an inner surface of the end portions of said tubular member so as to normally center said rotor within said housing in a non-signal developing position, and said cross spring members resiliently opposing the angular movement of the end portions of the tubular member in said collars so as to tend to maintain said rotor in a non-signal developing position relative to said housing.

6. The combination defined by claim 4 including linkage means operatively connecting the fluid pressure responsive means to the housing, the flexural pivot means including a tubular member extending through the rotor and affixed thereto, collars secured in said housing, said collars having arcuate channels for supporting opposite end portions of the tubular member, said arcuate channels being so arranged as to permit limited angular movement of said end portions in the collars, cross spring members having opposite ends thereof affixed to an inner surface of said collars and an inner surface of the end portions of said tubular member so as to normally center said rotor within said housing in a non-signal developing position, and said cross spring members resiliently opposing the angular movement of the end portions of the tubular member in said collars so as to tend to maintain said rotor in a non-signal developing position relative to said housing, the brake means including an annular brake member affixed to said rotor, spring arms for operatively engaging said brake member for retarding movement of said rotor, and operator-operative means for biasing said spring arms out of engaging braking relation with said brake member.

7. The combination defined by claim 4 including linkage means operatively connecting the fluid pressure responsive means to the housing, the flexural pivot means including a tubular member extending through the rotor and affixed thereto, collars secured in said housing, said collars having arcuate channels for supporting opposite end portions of the tubular member, said arcuate channels being so arranged as to permit limited angular movement of said collars relative to siad end portions, cross spring members having opposite ends thereof affixed to an inner surface of said collars and an inner surface of the end portions of said tubular member so as to normally center said rotor within said housing in a non-signal developing position, said cross spring members resiliently opposing the angular movement of the collars relative to said end portions of the tubular member so as to tend to maintain said rotor in a non-signal developing position relative to said housing, the brake means including an annular brake member affixed to one of the end portions of the tubular member, spring arms for operatively engaging said brake member for retarding movement of said rotor, and operator-operative means for biasing said spring arms out of engaging braking relation with said brake member.

8. The combination comprising a housing having inductive windings mounted therein, a rotor mounted in said housing in cooperative relation to said windings for effecting an output signal, a flexural pivot device including a tubular member extending through the rotor and affixed thereto, a pair of collars secured in said housing at opposite ends of said tubular member, said tubular member having segmental end portions at opposite ends thereof, said collars having arcuate channels for receiving the segmental end portions of the tubular member, said arcuate channels being so arranged as to permit limited angular movement of the segmental end portions in the arcuate channels of the collars, cross spring members having opposite ends thereof affixed to an inner surface of said collars and an inner surface of the segmental end portions of the tubular member so as to normally center said rotor within said housing in a non-signal developing position relative to said inductive windings, said cross spring members resiliently opposing the angular movement of the segmental end portions in said arcuate channels so as to tend to maintain said rotor in a non-signal developing position relative to said inductive windings, bearing means for rotatably supporting said housing, fluid pressure responsive means operatively connected to said housing for imparting angular movement thereto, and brake means selectively operative for holding the rotor against such angular movement being imparted thereto through said flexural pivot device while said device permits movement of the housing and inductive windings mounted therein relative to said rotor for effecting the output signal.

9. In a synchro including a housing element having inductive windings mounted therein and a rotor element mounted in said housing in cooperative relation to said windings for effecting an output signal; the improvement comprising a flexural pivot device including a tubular member extending through the rotor element and affixed thereto, a pair of collars secured in said housing element at opposite ends of said tubular member, said tubular member having segmental end portions at opposite ends thereof, said collars having arcuate channels for receiving the segmental end portions of the tubular member, said arcuate channels being so arranged as to permit limited angular movement of the segmental end portions in the arcuate channels of the collars, cross spring members having opposite ends thereof affixed to an inner surface of said collars and an inner surface of the segmental end portions of the tubular member so as to normally center said rotor element within said housing element in a non-signal developing position relative to said inductive windings, said cross spring members resiliently opposing the angular movement of the segmental end portions in said arcuate channels so as to tend to maintain said rotor element in a non-signal developing position relative to said inductive windings; bearing means for rotatably supporting said housing element, means for imparting angular movement to one of said elements, and brake means selectively operative for holding the other of said elements against such angular movement being imparted thereto through said flexural pivot device while said device permits relative movement between said rotor and housing elements for effecting the output signal.

10. In a synchro including a housing element having inductive windings mounted therein and a rotor element mounted in said housing element in cooperative relation to said windings for effecting an output signal; the improvement comprising flexural pivot means for supporting the rotor element within the housing element and normally centering said rotor element within said housing element in a non-signal developing position relative to the inductive windings, means for imparting angular movement to one of said elements, and brake means selectively operative for retarding movement of the other of said elements so as to render said flexural pivot means ineffective to center said rotor element in the non-signal developing position upon said angular movement being imparted to said one element while permitting a movement of said one element relative to said other element to effect the output signal.

References Cited in the file of this patent

UNITED STATES PATENTS 2,948,887     Mounteer  --------------  Aug. 9, 1960